ns Incorporated,

United States Patent [19]

Kansy et al.

[11] Patent Number: 5,315,114
[45] Date of Patent: May 24, 1994

US005315114A

[54] INTEGRATED CIRCUIT DETECTOR ARRAY INCORPORATING BUCKET BRIGADE DEVICES FOR TIME DELAY AND INTEGRATION

[75] Inventors: Robert J. Kansy; Ricky B. Garner, both of Garland, Tex.

[73] Assignee: Texas Instruments Incorporated, Dallas, Tex.

[21] Appl. No.: 332,039

[22] Filed: Dec. 18, 1981

[51] Int. Cl.$^5$ .................... H01L 25/00; G02B 26/10; H04N 3/14
[52] U.S. Cl. .................................. 250/332; 250/334; 348/164; 348/295
[58] Field of Search ................ 250/332, 334; 358/211, 358/213

[56] References Cited

U.S. PATENT DOCUMENTS

| | | | |
|---|---|---|---|
| 3,683,193 | 8/1972 | Weimer | 358/213 |
| 4,001,501 | 1/1977 | Weimer | 358/213 |
| 4,054,797 | 10/1977 | Milton et al. | 250/334 |
| 4,280,141 | 7/1981 | McCann et al. | 358/213 |
| 4,382,267 | 5/1983 | Angle | 358/213 |

*Primary Examiner*—Stephen C. Buczinski
*Attorney, Agent, or Firm*—William E. Hiller; Richard L. Donaldson

[57] ABSTRACT

A chip set containing an infrared detector array and two signal processors are located on the focal plane of an infrared detecting system. Included in the processors is time delay and integrate circuitry for improvement of the signal-to-noise ratio of the detector outputs before further processing, remote to the focal plane. The time delay and integrate circuitry is comprised of a number of bucket brigade devices which are situated to form a parallel-input serial shift register. Detector column input signals are decoded and the appropriate detector signal loaded into the correct port on the shift register, so that correlated signals are summed as they move through the register.

11 Claims, 3 Drawing Sheets

INTEGRATED CIRCUIT DETECTOR ARRAY INCORPORATING BUCKET BRIGADE DEVICES FOR TIME DELAY AND INTEGRATION

BACKGROUND OF THE INVENTION

This invention relates to semiconductor detector systems in general, and more specifically, to scanned infrared detector systems.

As resolution requirements for all types of infrared detecting systems have increased, the size of the individual detector in an array has been reduced. As a result of this reduced size, detectors found in systems currently in use have only a limited charge storage capacity in relation to the dwell time required. This shortcoming in detectors is due to the fact that present detectors become saturated within the period of dwell times presently used. If not for this problem, a single sample of a detector would be sufficient, and less circuitry would be required for processing of array output signals. However, due to the state of the art in detector materials and performance, in that detectors are inadequate to store the charge which they would collect in a typical dwell time, most scanned detector infrared systems require some form of signal conditioning on the focal plane. One method for accomplishing this signal conditioning is to accumulate detector samples on a switched capacitor. This method allows a detector to be sampled and reset a number of times per dwell time. The result of this action is a weighted sum of detector samples capacitively stored. The accumulation of samples creates a gain, which varies directly with the number of samples taken. This gain acts to improve the signal to noise ratio of the array output signals.

SUMMARY OF THE INVENTION

In one aspect of the present invention, a multiple column detector array is provided, with each detector column being coupled to a plurality of sampling transistors which may be switched on by sequential pulses applied to the gates thereof to allow the detector outputs as sampled to be stored in respective capacitors for a dwell period. Sampling onto a capacitor implements the pixel accumulation that can be done several times per dwell time. Each switched capacitor is also coupled to an analog storage device. The analog storage devices are coupled in such a manner as to form a shift-and-store function. This arrangement has previous samples moving in sync with the scan along the shift-and-store function, in effect, following the information which generated them, as the information is scanned across the detector array. The result is a sum of samples of the charge level corresponding to the IR energy level of the information as seen by a number of detectors. The output of the shift-and-store function then is a sum of correlated samples, the number of samples being equal to the number of detector columns coupled to the shift-and-store function.

This is an improvement over the accumulator system previously mentioned, in that detector samples are accumulated over multiple dwell times. The signals are time delayed and subsequently integrated with correlated samples to improve the output of the detector column. In a preferred embodiment of the present invention, the detector array signals are processed in the following sequence: detector samples are taken, and then stored on the switched capacitor and, at the proper time, the stored data is loaded into the proper port of a shift-and-store function implemented in "bucket-brigade devices". The samples are then summed with the sample remaining from the previous dwell time. The summed data is then shifted to the next stage in the bucket brigade device, or to the output. The output signal will then represent the summation of a number of detector samples equal to the number of detector columns coupled to the bucket brigade device shift-and-store function. In other words, for four detector columns, the summation represents four samples, etc. Bucket brigade devices are well suited to this application in terms of physical space requirements, processing and temperature tolerance. In another aspect, a charge coupled device serial shift register may be used in place of the bucket brigade device shift-and-store function in an alternative embodiment. However, as previously noted, the bucket brigade device is much more compatible with standard IC processing.

In another preferred embodiment of the invention, there is provided a 3-chip set to be located in very close proximity to each other on the focal plane of the detector system. Of the three chips, one contains the detector array, and the other two are signal processors.

The detector chip includes an insulating substrate, for example, sapphire, having areas of HgCdTe deposited to form detectors, and typically oxide deposited to separate the detectors. Metal is deposited for conductors to bring signals out to interconnects for routing to appropriate functions. The detectors are physically laid out in two rows of 105 columns, each column having nine detector elements. The two rows are interspersed in an offset manner. Each column sends its detected signal to the nearest processor, i.e., signals from every other column go to the same processor. Each processor is a silicon integrated circuit containing 105 channels for processing of detector signals. Each channel is identical, and consists of several stages of processing. The first stage is a preamplifier. Since the detector output is a charge level, the input impedance of the pre-amp is high, for converting the charge signal to a voltage signal. After the pre-amp, the next stage is a correlated double sample circuit. The correlated double sample circuit reduces the amount of channel noise with no effect on the signal. The signal then goes to a nine-stage TDI function. As the scan goes down the detector column, each detector signal is directed to the appropriate stage in the TDI by a demultiplexing signal.

The TDI produces an improved detector signal, which then moves to an offset correction circuit. The offset correction with hold circuit sets the correct DC level for the signal, and holds the signal for the appropriate clock signal. The final stage is the multiplexer and post amp. The multiplexer selects the appropriate signal line, and that signal is passed to the post-amp for further processing remote to the dewar environment.

It is therefore an object of the present invention to provide a method and means for signal conditioning of focal plane detector array signals before leaving the focal plane environment.

DETAILED DESCRIPTION OF THE DRAWINGS

Figure 1:
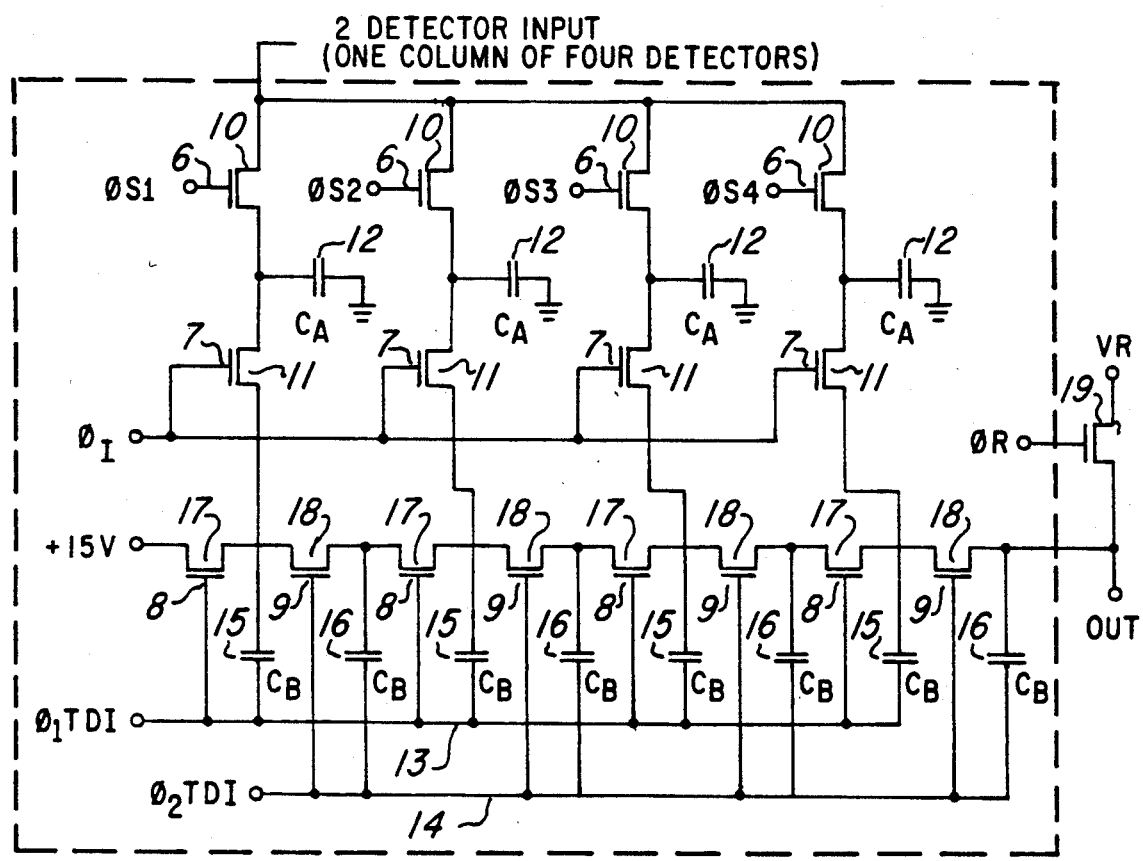
FIG. 1 is a schematic diagram of a discrete component implementation of the present invention.

Referring now to FIG. 1, there is shown a circuit diagram which represents a discrete component implementation of circuitry for the time delay and integration of detector signal samples from a single column of four detectors with outputs in parallel of an infrared detector array. Detector column output signals are decoded by applying a positive pulse to the gate of sampling transistor 10, which, when turned on, passes the correct detector for the channel sample to capacitor 12, where it is stored. The samples stored on capacitors 12 are then transferred to phase one capacitance 15 in the shift and store circuitry by turning on transistors 11. These samples are added to the reference voltage left on phase one capacitance 15 by completion of the previous shift and store operation. After the sample and reference have been summed on phase one capacitance 15, this signal is shifted to the right by applying a positive pulse to phase one transistors 17 and phase one capacitors 15. After phase one of time delay and integrate has been completed, phase two then is started. In this part of the operation, the signal is shifted right from phase two capacitance 16 to the phase one capacitance of the adjacent detector column circuitry. During the next dwell time, the process is repeated and samples taken are added to the signal already on phase one capacitance 15. This process is repeated until at the right most phase two capacitor 16 a summation of, in this case, four dwell time samples has been accumulated. The output from this detector column is then sent to further processing. The output of the TDI is a signal consisting of the summation of four samples, taken from separate detectors at different times. The time delay and integration of these correlated samples improves the signal-to-noise ratio of the output.

Figure 2:
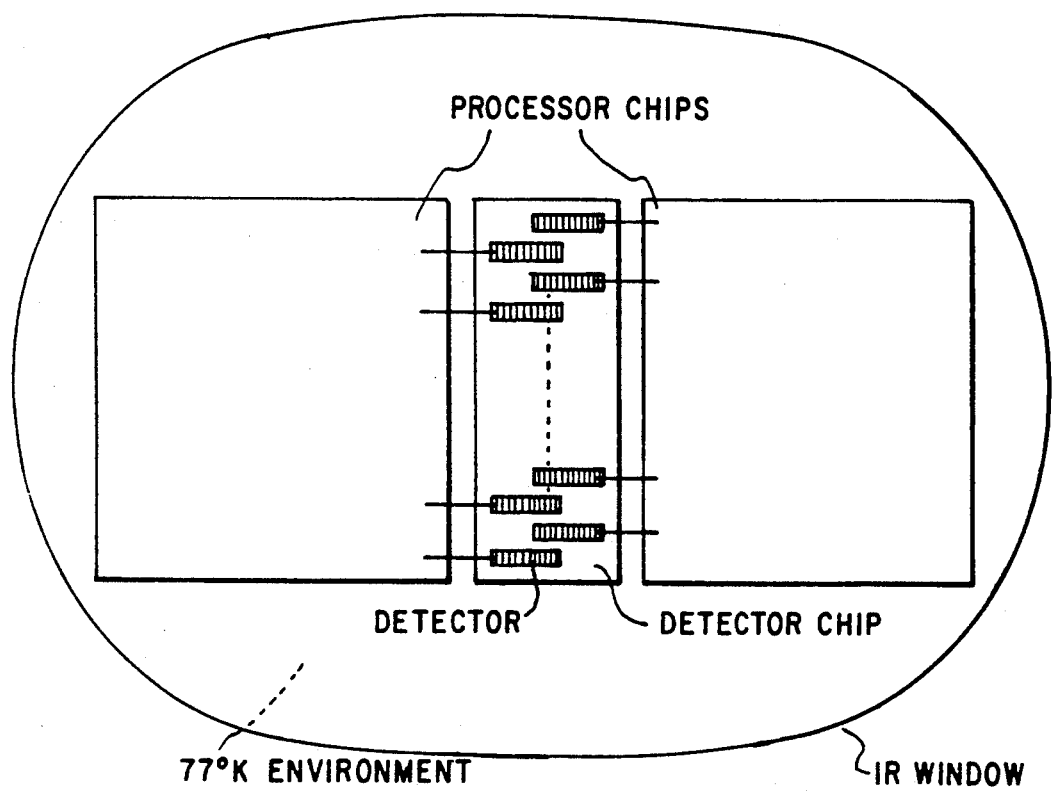
FIG. 2 is a diagram showing the physical layout of the detector chip and processor chips as they appear on the focal plane in a modular dewar application.

FIG. 2 is a pictorial drawing of the physical layout of the 3-chip set in place in an enclosed chamber of the modular dewar. The detector chip is composed of 2 offset rows of detectors, each row having 105 columns. In each column, there are 9 detectors which are Connected in parallel, and the charge generated by the detectors is coupled to a channel on a processor chip by a fine wire, bonded at each end. The detectors are fabricated by mounting a strip of HgCdTe on an insulating substrate, such as .sapphire or high resistance silicon. The array is completed by removal of the detector material in amounts sufficient to provide separation between the detectors in each row, and between those in a column. To interconnect the detector columns, small, thin strips of metal are deposited down the column. The metal strips are terminated at a bonding pad, where connection is made to a processor chip.

The processor chips are typical silicon substrate architecture. Each one receives detector column input from 105 detector columns.

Figure 3:
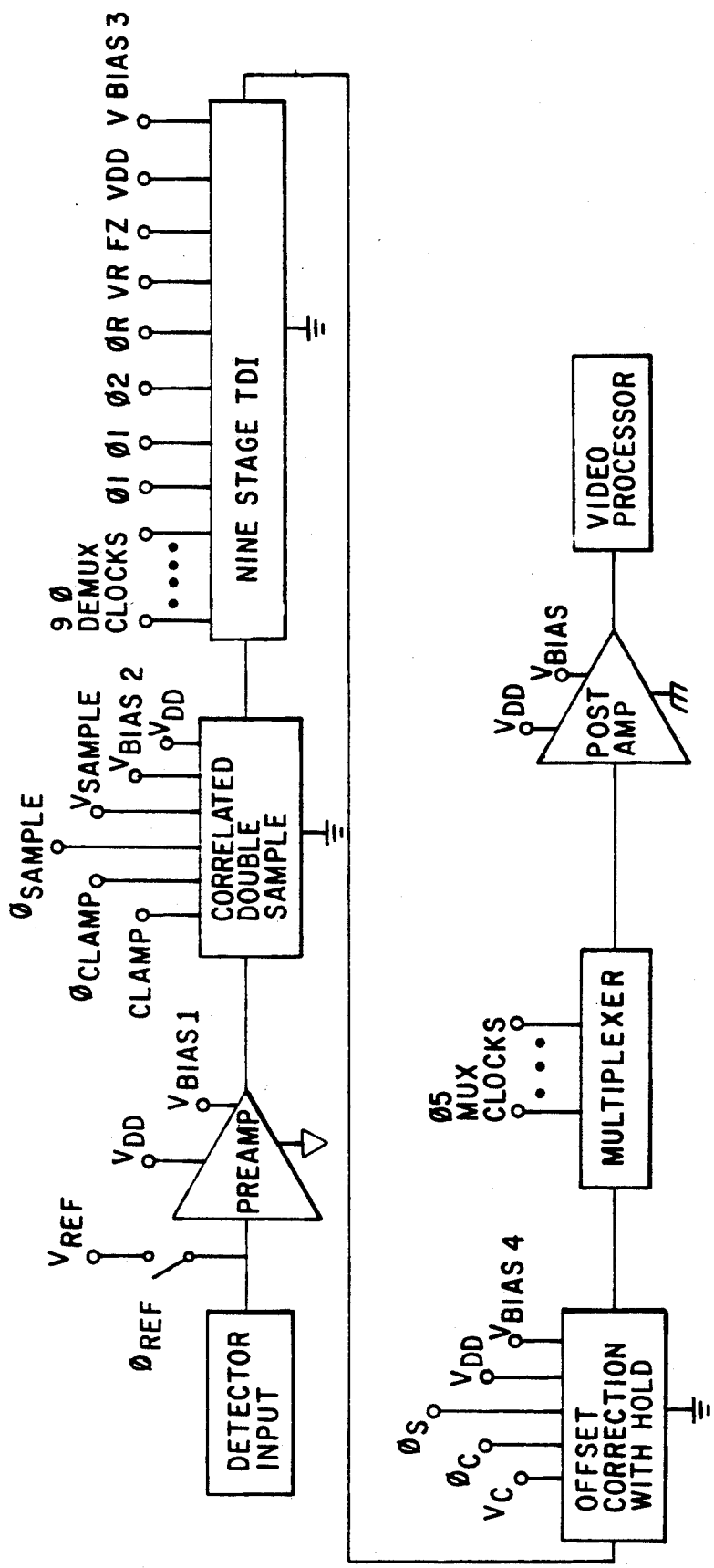
FIG. 3 is a functional diagram showing a single channel of detector column input and processor operations.

As shown in FIG. 3, each detector column input goes to a pre-amplifier stage. This pre-amp has a high-impedance input to insure proper conversion of the detector charge signal output to a voltage signal. From the pre-amp, the signal goes to a correlated double sample circuit, which is a noise suppression circuit. The signal is then applied to the TDI, then exits the processor through multiplexing circuits and post amp.

Figure 4:
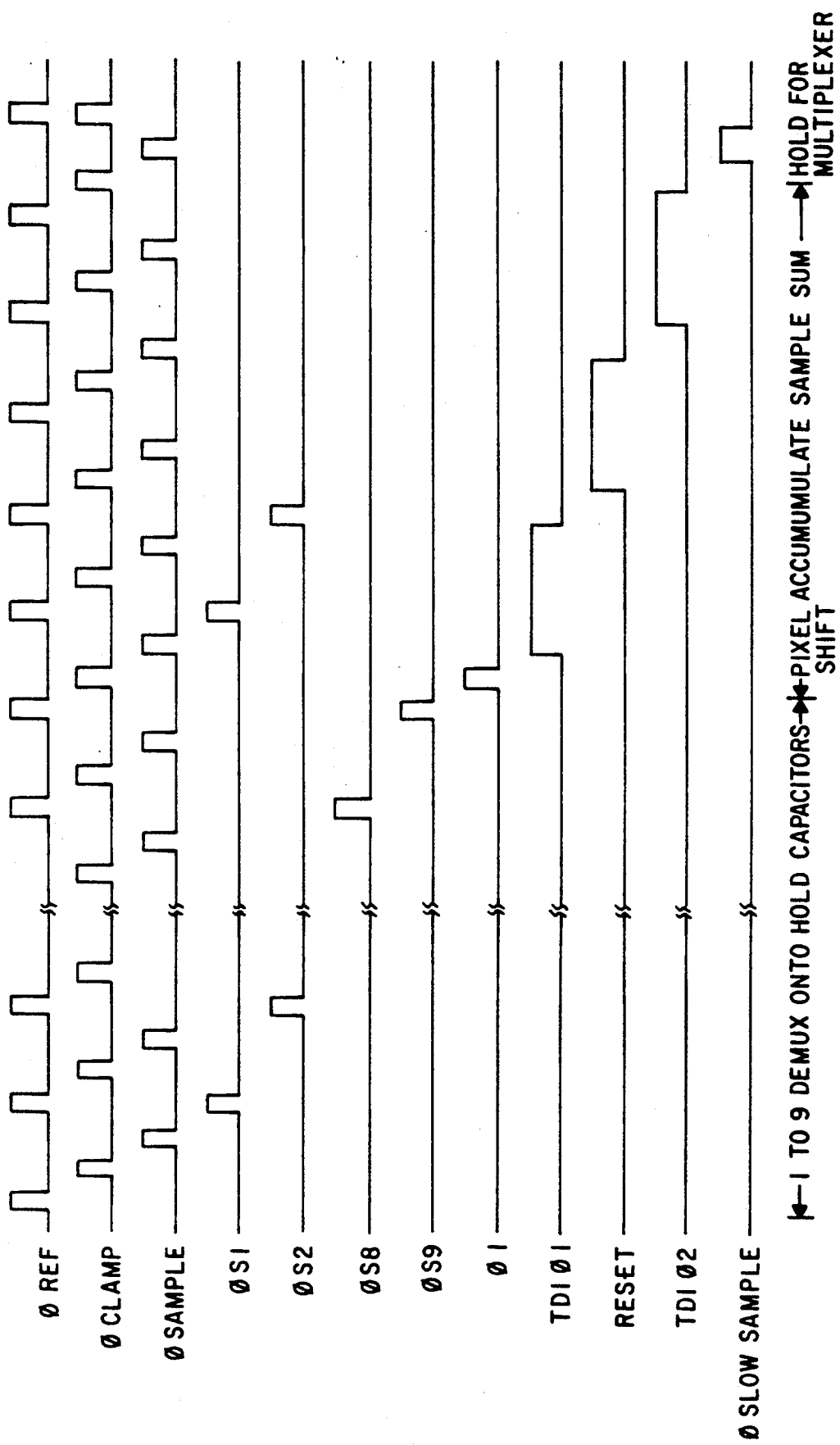
FIG. 4 is a waveform diagram showing the timing relationships of the sampling and processing functions of a channel as in FIG. 3.

FIG. 4 is a waveform timing diagram showing the timing relationship between processor functions.

This device and method have advantages not previously possessed by detector arrays of this type.- One advantage is the different gains for signal and noise in a TDI system. The use of bucket-brigade devices is advantageous because of their compatability with standard MOS fabrication methods.

SNR improvement is provided in a TDI system in that correlated samples (signals) are summed directly and uncorrelated samples (noise) are summed in quadrature. The SNR improvement in a TDI system is then $\sqrt{N}$, where N is the number of samples taken.

What is claimed is:

1. A method for improving the output signal-to-noise ratio performance of an integrated circuit infrared detector array by electronic signal processing, comprising the steps of:

scanning an integrated circuit infrared detector array relative to a target area to generate charge levels in the respective infrared detectors corresponding to the infrared energy level sensed thereby;

sampling the charge level corresponding to the infrared energy level sensed by a plurality of infrared detectors during the respective dwell times of the detectors between successive detection cycles in which the infrared energy level incident to the respective detectors is sensed in providing the charge levels to be sampled;

accumulating samples of the charge levels over a plurality of dwell times for the respective detectors;

summing successive accumulated samples of the charge levels from each detector with stored accumulated samples of the charge levels from the previous detector through a plurality of time delay and integrate stages such that a sum of accumulated samples equal to the number of detector dwell times in a column of detectors is generated; and producing an output signal from the final time delay and integrate stage representative of the summation of the number of detector samples equal to the number of detector columns included in the processing of the summed successive accumulated samples through said plurality of time delay and integrate stages.

2. A method as set forth in claim 1, wherein sampling the charge levels corresponding to the infrared energy level sensed by the plurality of infrared detectors is accomplished be sequentially pulsing the gates of sampling transistors corresponding to the respective infrared detectors to render said sampling transistors conductive in sequence, and storing the charge levels in respective capacitors corresponding to individual sampling transistors.

3. A method as set forth in claim 1, further including converting the charge levels generated by the respective infrared detectors to voltage signals prior to the sample accumulation step such that the voltage signals are representative of the charge levels.

4. A method as set forth in claim 3, wherein the sample accumulation and summing of successive accumulated samples corresponding to a column of detectors is accomplished by demultiplexing the voltage signals representative of the charge levels generated from said column of detectors sequentially through said plurality of time delay and integrated stages as scanning along said column of detectors proceeds to deliver one voltage signal to each stage of said plurality of time delay and integrate stages in a timed sequence.

5. A method as set forth in claim 4, wherein the production of the output signal from the final time delay and integrate stage is accomplished by multiplexing the sequence of summed accumulated samples to deliver the output signal corresponding to a particular column of detectors as the summed accumulated samples derived from the individual detectors included in said column.

6. An integrated circuit device chip set comprising:
an integrated circuit detector array chip having a plurality of detectors capable of sensing infrared energy upon exposure thereto and generating charge levels corresponding to the infrared energy level sensed thereby, said detectors being arranged in at least one column of a plurality of detectors; and
at least one integrated circuit signal processing chip operably associated with said detector array chip for receiving inputs from said at least one column of a plurality of detectors, said at least one signal processing chip including
sampling means for accepting inputs from said one column of detectors as samples of charge levels corresponding to the infrared energy level sensed by said detectors during the respective dwell times of the detectors between successive detection cycles,
storage means for accepting respective samples of charge levels during activation of said sampling means,
serial shift and store means having a plurality of time delay and integrate stages operably associated with said storage means,
means for transferring stored samples of charge levels from said storage means to said shift and store means, said transferred stored samples being added to the previous stored samples left in respective time delay and integrate stages,
means for shifting the contents of each time delay and integrate stage to the next successive time delay and integrate stage in a time sequence in synchronization with the transfer of stored samples from said storage means to respective time delay and integrate stages, and
means for producing an output signal from the final time delay and integrate stage representative of the summation of the number of detector samples equal to the number of detector columns included in the processing of the summed successive accumulated samples through said plurality of time delay and integrate stages and representative of different dwell times of a detector array scan.

7. An integrated circuit device chip set as set forth in claim 6, wherein said sampling means comprises a plurality of sampling transistors respectively corresponding to said plurality of detectors, each of said sampling transistors normally being non-conductive but having a gate adapted to be pulsed in a timed sequence to render said sampling transistor conductive for passing the charge level incident thereon during each conductive period to said storage means as discrete charge level samples.

8. An integrated circuit device chip set as set forth in claim 7, wherein said storage means comprises a plurality of capacitors respectively operably associated with individual sampling transistors.

9. An integrated circuit device chip set as set forth in claim 8, wherein said serial shift and store means comprises a plurality of bucket brigade semiconductor devices coupled in series, and a plurality of capacitors coupled in parallel, said plurality of bucket brigade semiconductor devices being alternately disposed with said plurality of capacitors such that each time delay and integrate stage comprises a bucket brigade semiconductor device and a capacitor.

10. An integrated circuit device chip set as set forth in claim 9, wherein said means for shifting the contents of each time delay and integrate stage to the next successive time delay and integrate stage comprises first and second clock phases respectively corresponding to alternate time delay and integrate stages, and means for alternately activating said first and second clock phases to advance the stored contents of each time delay and integrate stage to the next successive time delay and integrate stage.

11. An integrated circuit device chip set as set forth in claim 6, further including
pre-amplifier means having a high impedance input for receiving charge level samples corresponding to the infrared energy level sensed by said detectors and converting said charge level samples to voltage signals representative thereof.

* * * * *